No. 726,870. PATENTED MAY 5, 1903.
E. CORNBERG.
LOCK HINGE.
APPLICATION FILED JULY 2, 1901.
NO MODEL.
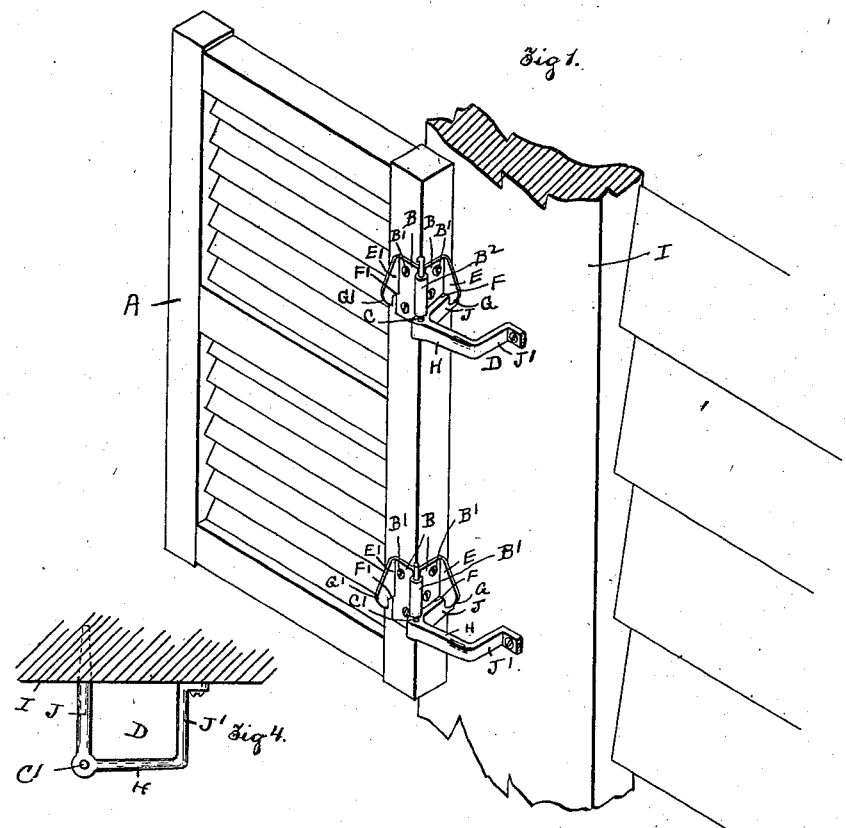
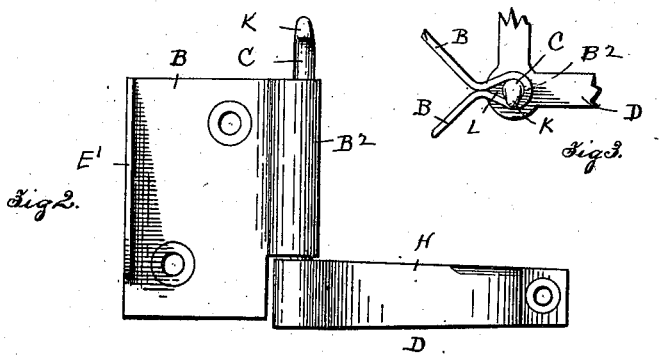
Witnesses: Inventor:
Emil Cornberg.
By Rufus B Fowler
Attorney.

No. 726,870. Patented May 5, 1903.

UNITED STATES PATENT OFFICE.

EMIL CORNBERG, OF GARDNER, MASSACHUSETTS.

LOCK-HINGE.

SPECIFICATION forming part of Letters Patent No. 726,870, dated May 5, 1903.

Application filed July 2, 1901. Serial No. 66,928. (No model.)

*To all whom it may concern:*

Be it known that I, EMIL CORNBERG, a citizen of the United States, residing at Gardner, in the county of Worcester and Commonwealth of Massachusetts, have invented a new and useful Improvement in Lock-Hinges, of which the following is a specification, accompanied by drawings forming a part of the same, in which—

Figure 1 represents in perspective view a window-shutter with my improved shutter-fastener attached thereto. Fig. 2 is a front elevation of the fastening device removed from the shutter. Figs. 3 and 4 represent top views of portions of the fastener.

Similar reference letters refer to similar parts in the different views.

My invention relates to a shutter-fastener combined with the hinge of the shutter for the purpose of locking the shutter in its opened or closed position; and it consists in providing the leaves of the shutter-hinge with projecting notched wings adapted to engage a bracket attached to the building, said wings having beveled ends adapted to slide over the bracket as the shutter is opened or closed, and thereby cause the shutter to be automatically fastened by the operation of opening or closing.

Referring to the drawings, A, Fig. 1, denotes a window-shutter provided with hinges which comprise the leaves B at right angles to each other, which are attached to the shutter by screws B', and a barrel $B^2$, inclosing the pintles C C', which are supported upon the brackets D, attached to the side of the building. The leaves B are provided with wings E E', projecting at right angles to said leaves and having notches F F' and beveled lower ends G G'. The bracket D consists of a bar H parallel with the side of the building I and having the legs J J', which are attached to the building, the pintles C C' being supported at the corner formed by the bar H and leg J, which are at right angles to each other and contribute the two members of the bracket which are engaged by the notched wings E E'. When the shutter is closed in the position shown in Fig. 1, the beveled end G of the wing E slides over the leg J of the bracket, thereby slightly lifting the shutter, which falls into position as the shutter is fully closed, causing the notch F to engage the leg J and hold the shutter from being opened. In order to open the shutter, it is raised on its pintles to release the leg J from the notch F, allowing the shutter to be swung open, when the beveled edge G' of the wing E' will slide over the bar H, causing the notch F' to engage the bar and hold the shutter in its open position.

The pintle C is provided on one side with a projecting prong K, and the barrel $B^2$ of the upper hinge is provided with an opening L to allow the projection K to pass through the barrel when the shutter is midway between its opened or closed position; but in all other positions the projection K is arranged to extend over the top of the barrel, as shown in Fig. 3, and prevent the barrel from being entirely lifted off the pintle.

The upper and lower hinges of the shutter are duplicates of each other, thereby locking the shutter in position near the upper and lower ends. The bracket upon which the shutter is hinged is provided with two points of attachment by the legs J J', and the locking-wings E E' are formed by turning over the edges of the leaves B, allowing the hinges to be stamped from sheet metal, and the necessity of locking or fastening devices on the window-stool is obviated.

What I claim as my invention, and desire to secure by Letters Patent, is—

1. A lock-hinge comprising a plate and a bracket, the plate having a notched wing located away from the barrel of the hinge, the wing having a beveled end to ride up on the bracket, the bracket comprising two members at an angle to each other, one of which is arranged to be engaged by the notched wing to lock the movable device to which the hinge is attached, in position.

2. A lock-hinge comprising two parts, one of which is a bracket, and the other a pair of integral leaves disposed at an angle to each other whereby to embrace two edges of the hinged device, and notched wings projecting outwardly from the leaves constructed to ride up upon and engage the bracket in either of the extreme positions of the hinged device.

3. A lock-hinge comprising a bracket, a pintle and a sheet-metal plate bent at the center to form a barrel and two leaves disposed at an angle to each other and the ends of the leaves bent outwardly in the form of wings, said wings beveled on one edge and notched to ride up upon and lock to the bracket.

Dated this 1st day of June, 1901.

EMIL CORNBERG.

Witnesses:
EDWARD G. WATKINS,
THATCHER B. DUNN.